United States Patent
Allen et al.

(12) 
(10) Patent No.: US 7,513,193 B2
(45) Date of Patent: Apr. 7, 2009

(54) METHOD AND INSTALLATION FOR IRRADIATING BULK MATERIAL

(75) Inventors: Wickham Allen, Midland, MI (US); Philippe Peltier, Dion-Le-Mont (BE); Noel Goethals, Maldegem (BE)

(73) Assignee: Ion Beam Applications S.A., Louvain-La-Neuve (BE)

( * ) Notice: Subject to any disclaimer, the term of this patent is extended or adjusted under 35 U.S.C. 154(b) by 697 days.

(21) Appl. No.: 10/487,129

(22) PCT Filed: Aug. 20, 2002

(86) PCT No.: PCT/BE02/00138

§ 371 (c)(1), (2), (4) Date: Jul. 16, 2004

(87) PCT Pub. No.: WO03/017747

PCT Pub. Date: Mar. 6, 2003

(65) Prior Publication Data

US 2004/0234656 A1 Nov. 25, 2004

(30) Foreign Application Priority Data

Aug. 21, 2001 (EP) ................................ 01870180

(51) Int. Cl.
*A23L 1/00* (2006.01)
*A23L 3/00* (2006.01)
*A61L 2/00* (2006.01)

(52) U.S. Cl. .............................. 99/451; 99/483; 422/22; 422/186; 250/433; 250/434; 250/436; 250/455.11

(58) Field of Classification Search .................. 99/451, 99/483, 443 C; 250/455.11, 453.11, 454.11, 250/433, 434, 435, 436; 422/22, 186; 426/238, 426/239, 240, 244

See application file for complete search history.

(56) References Cited

U.S. PATENT DOCUMENTS

| | | | | |
|---|---|---|---|---|
| 4,026,154 A | * | 5/1977 | Pfeiffer et al. | 73/863.44 |
| 4,276,983 A | * | 7/1981 | Witmer | 209/587 |
| 5,309,773 A | * | 5/1994 | Tokoyama | 73/863.01 |
| 5,434,421 A | | 7/1995 | Burth et al. | |
| 5,801,387 A | * | 9/1998 | Nablo et al. | 250/492.3 |
| 6,575,084 B2 | * | 6/2003 | Allen et al. | 99/451 |

FOREIGN PATENT DOCUMENTS

| | | |
|---|---|---|
| EP | 0 705 531 | 4/1996 |
| EP | 1 080 623 | 3/2001 |
| JP | 61107139 | * 5/1986 |

* cited by examiner

*Primary Examiner*—Reginald L Alexander
(74) *Attorney, Agent, or Firm*—Fitch, Even, Tabin & Flannery

(57) ABSTRACT

The present invention is related to method for irradiating bulk material, particularly for treatment of food products such as grain, characterized in that in the case of a failure of said irradiation, the untreated bulk material is separated from the treated material and subsequently transported back towards the beginning of the process, in order to be treated. The invention allows to avoid re-treatment of large quantities of material, and provides a clear separation between contaminated and uncontaminated parts of the installation.

8 Claims, 4 Drawing Sheets

METHOD AND INSTALLATION FOR IRRADIATING BULK MATERIAL

FIELD OF THE INVENTION

The present invention is related to a device for the irradiation of bulk products, in particular food products in bulk, such as grain.

STATE OF THE ART

The disinfestation of grain by irradiation is a known technique. A radiation source, such as a beam of accelerated electrons or a beam of X-rays is preferably used for this purpose. Many known techniques and installations, such as the one described in EP-A-705531 are related to irradiation of particles, preferably grain, as it falls through a vertical shaft. When the irradiation is stopped during the process, for example due to a machine failure, it is impossible to separate the treated from the untreated grain. Even if the supply is stopped very quickly, a minimum amount of untreated material will fall through the shaft without being irradiated, and join the already treated material, mixing with it. This causes large amounts of grain to be re-treated in order to be sure that no untreated grain mixes with the already treated batch. Also, it requires parts of the installation which are normally only in contact with treated material, to be thoroughly cleaned and disinfected after any machine failure. An additional drawback of the free fall system is that the bulk material may be damaged in the fall.

Document EP-A-1080623 is related to a method for irradiating bulk material, wherein a vertical conveyor system is used allowing the bulk material to pass several times before the beam. The problem of separating untreated material from treated material in case of machine failure is however not addressed in this document.

AIMS OF THE INVENTION

The present invention aims to provide a method and installation for irradiating bulk material, such as grain, an such a way that, in case of failure of the radiation source, one can separate untreated from treated material.

SUMMARY OF THE INVENTION

The present invention is related to a method for irradiating bulk material, particularly for treatment of food products such as grain, comprising the steps of:
  providing a continuous supply of said bulk material onto a conveying device, said conveying device being at least partially placed inside an irradiation cell, said conveying device being exposed to an irradiation beam, allowing treatment of said material,
  evacuating the treated material at the end of said conveying device,
characterised in that:
  said conveying device transports said material in an essentially horizontal direction, and
  in the case of the loss or insufficiency of the irradiation, the untreated and badly treated bulk material that should have been treated properly, is separated from the fully treated bulk material.

According to a preferred embodiment, said method further comprises an additional recuperation step taking place in the case of insufficiency or loss of the irradiation, said additional step consisting of transporting said untreated bulk material, after being separated from the treated bulk material, towards the beginning of said conveying device, in order for said untreated bulk material to be treated.

Said separation and recuperation are preferably obtained by performing the following steps:
  slowing down said conveying device at a predefined deceleration rate,
  blocking, inside said irradiation cell, the normal exit path of irradiated material out of said irradiation cell,
  creating, inside said irradiation cell, a new exit path, out of said irradiation cell,
  re-activating said conveying device, thereby forcing the material that was present on said device to be evacuated from the irradiation cell through said new exit path,
  transporting said material that was present on said conveying device back to the beginning of said conveying device.

Said step of creating a new exit path is preferably performed by rotating a hinged plate around an axis, over a predefined angle.

Said step or providing a continuous supply preferably comprises the following substeps:
  providing a continuous supply of said material to an input hopper,
  at a signal corresponding to an 'empty' condition in a weighing station, transferring said material to said weighing station, by opening a shutter underneath said input hopper,
  at a signal corresponding to the 'full' condition of said weighing station, closing said shutter underneath said input hopper, weighing said material, and transferring said material to a buffer hopper, by opening a shutter underneath said weighing station,
  transferring a continuous supply of said material from said buffer hopper, onto said conveying device.

Said conveying device may be a conveyor belt and wherein a layer of a constant width and thickness is preferably provided onto said conveyor belt. Said layer or a constant width is preferably created by supplying said material onto said belt by a slide, said slide being equipped with guides, said guides having preferably the shape of an inverse V. A layer of a constant thickness is preferably created by way of a horizontal scraper.

The invention is equally related to an installation for irradiating bulk material, in particular for treatment of food products such as grain, comprising the following elements:
  a device for creating a beam suitable for irradiation purposes,
  an irradiation cell,
  a supply system for providing a continuous supply of material to said irradiation cell,
  a first transport device for evacuating said material after irradiation from said irradiation cell,
characterized in that said installation further comprises a means for changing the exit path of said material after irradiation from a first exit path, leading to said first transport device to a second exit path.

The installation of the invention preferably further comprises a second transport device for transporting back towards said supply system, from said second exit path, at least the untreated material present in said irradiation cell, after a failure of said irradiation.

Said means for changing said exit path preferably comprises a hinged plate, operated by a cable, connected to a winch.

According to the preferred embodiment:
said supply means consist of a first hopper, above a weighing station, comprising a second hopper and placed in turn above a buffer hopper, leading to a screw conveyor, which takes the material through the wall of the irradiation cell,
a conveyor belt is placed wholly inside said irradiation cell, said conveyor belt comprising vertical ridges perpendicular to the translation of said conveyor belt,
a slide is placed between said screw conveyor) and said conveyor belt, said slide being equipped with guides, said guides having the shape of an inverse V,
said first and second transport devices are both screw conveyors, said installation further comprising two material elevators for transporting the material after said first and second screw conveyors, said second material elevator transporting the material back to said buffer hopper in case of an irradiation failure.

According to a second embodiment:
said supply means consist of a first hopper, above a weighing station, comprising a second hopper and placed in turn above a buffer hopper, leading to a screw conveyor, which takes the material through the wall of the irradiation cell,
said screw conveyor transports said material underneath said beam for irradiation,
said first and second transport devices are both screw conveyors, said installation further comprising two material elevators for transporting the material after said first and second screw conveyors, said second material elevator transporting the material back to said buffer hopper in case of an irradiation failure.

SHORT DESCRIPTION OF THE DRAWINGS

DETAILED DESCRIPTION OF THE INVENTION

Figure 1:
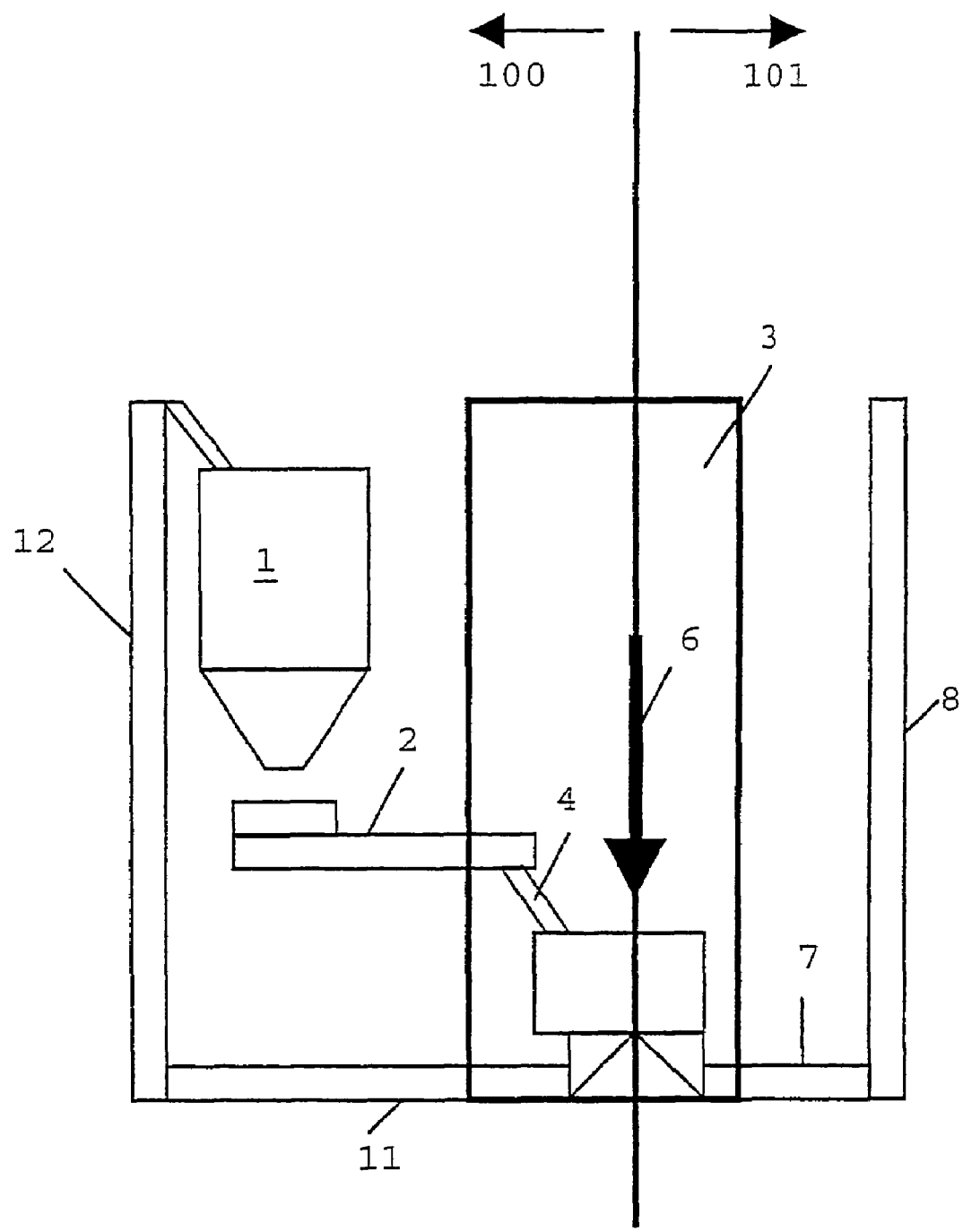
FIG. 1 represents a schematic view of an installation and of the process flow according to the present invention.

FIG. 1 shows a schematic view of the essentials in the process flow according to the method of the invention. The flow has to be clearly divided into two parts: untreated 100 and treated material 101. The transition from untreated to treated material is made in the irradiation cell 3.

According to a preferred embodiment, this material consists of grain, to be irradiated for disinfestation purposes. It may however equally consist of other food products such as fruit or potatoes, or of polymer powder or pellets. The treatment of the latter may comprise a grafting or curing operation.

According to the preferred embodiment of the method of the invention, the untreated material is brought by conveyors from the material storage (not shown) into a buffer hopper 1. A bulk material transport device 2, which is preferably a screw conveyor, feeds a continuous stream of bulk material through the wall of the irradiation cell 3 and onto a slide 4, allowing the bulk material to slide onto a conveying device 5, which is preferably a horizontal conveyor belt. The belt is preferably made of stainless steel jointed slats, or stainless steel webbing. The conveying device may also be an "en-masse" conveyor, wherein the bulk material is transported in a u-shaped trough by horizontal slats driven by chains. Special guides are present on the slide 4, in order to distribute the bulk material in a layer which covers the whole width of the conveyor belt 5. A blade system on the slide 4 will make sure that the bulk material layer thickness is equal to a predefined value over the whole width of the conveyor belt 5. These features are explained in more detail further in this description. Once the bulk material is on the conveyor belt 5, it will be transported under the beam 6 and irradiated by this beam, which may be produced by an electron accelerator (not shown).

According to a second embodiment of the invention, the screw conveyor 2, slide 4 and conveyor belt 5 are replaced by one screw conveyor, and the bulk material is irradiated while being transported by that one screw conveyor, underneath the beam. The preferred embodiment however comprises a screw conveyor 2, slide 4 and a horizontal conveyor belt 5, carrying a layer of bulk material of a constant thickness underneath the beam 6.

The irradiation of the bulk material marks the transition from the untreated part 100 of the process to the treated part 101. After treatment, the bulk material drops into a funnel, and is normally led into a transport device 7, preferably a second screw conveyor, which transports the bulk material out of the irradiation cell, through the wall of the cell, and feeds it into a bulk material elevator 8. From here the bulk material is transported to the treated bulk material storage.

If a failure occurs during the irradiation process, the conveyor belt 5 and the supply screw conveyor 2 are immediately stopped. Such a failure may be a complete loss of irradiation, or an insufficient irradiation due to a defect in the radiation source. Once the belt 5 is stopped, the material that is still on it is either badly or insufficiently treated or not treated at all. Means 40 are provided to lead the untreated and badly treated bulk material that should have been treated properly, not into the evacuation screw conveyor 7, but into a transport device 11, preferably a third screw conveyor, which recuperates the untreated and badly treated bulk material and sends it back to the start of the process flow, in order to be re-treated. The untreated and badly treated bulk material is evacuated through the screw conveyor 11 and fed into a bulk material elevator 12. On top of the bulk material elevator 12 the bulk material is released into the buffer hopper 1 in order to be (re)treated.

The invention is characterised by the presence of the means 40 for separating untreated and badly treated bulk material in case of an irradiation failure. This feature avoids any mixing of untreated and treated materials. Also, a clear separation between untreated and treated parts of the installation is present, allowing a quick restart in case of failure, obviating the necessity for a thorough cleaning or disinfecting operation. In a preferred embodiment, the invention also comprises means for recuperating and recirculating (11,12) untreated and badly treated bulk material. In the following, a preferred embodiment of the method and installation, including the means 40 for separating the materials is described in detail.

DESCRIPTION OF A PREFERRED EMBODIMENT OF THE INVENTION

Figure 2:
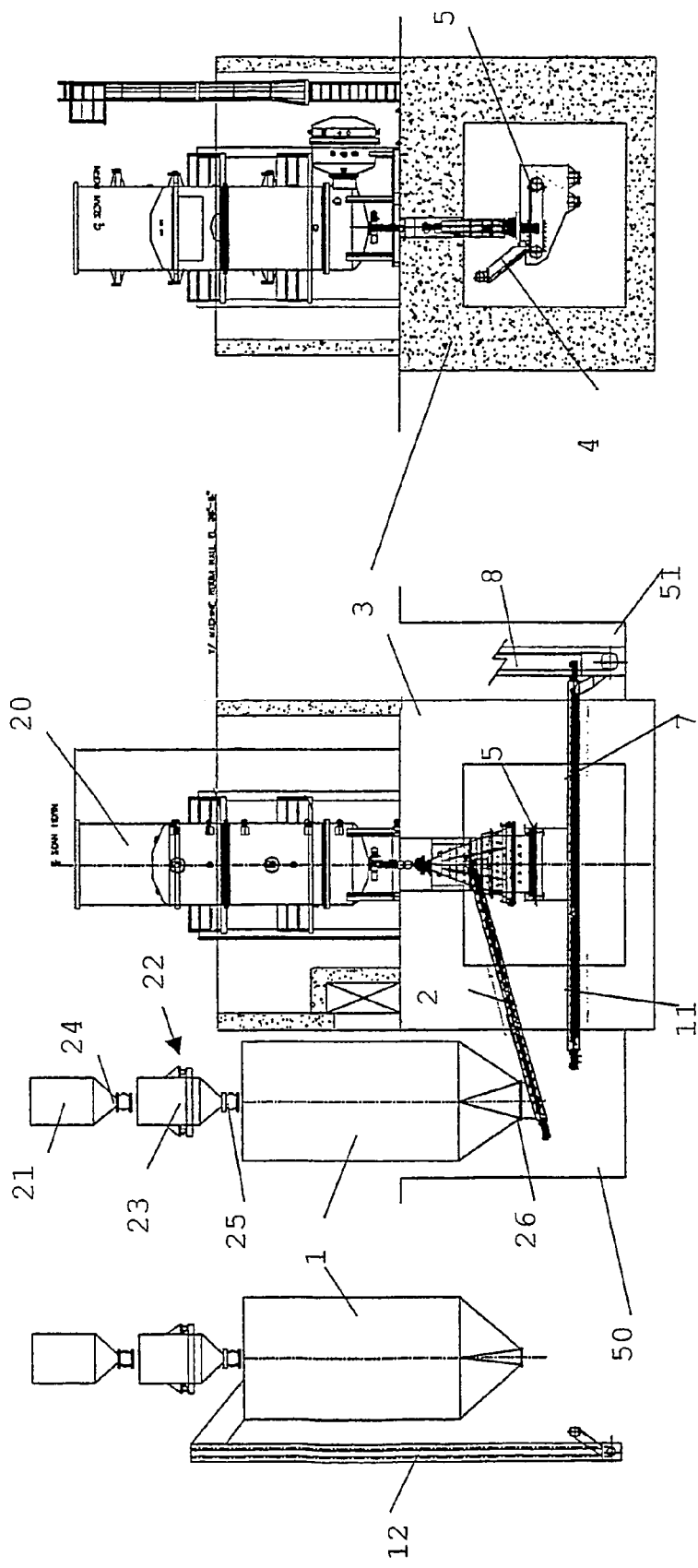
FIG. 2 represents a detailed view of an installation according to a preferred embodiment of the present invention.

FIG. 2 shows a detailed view of an installation according to a preferred embodiment of the invention. FIG. 2b and 2c show a frontal and side view of the whole of the installation, FIG. 2a shows a side view of the supply system only. Many of the elements described above can be recognised: irradiation cell 3, buffer hopper 1, supply screw conveyor 2, slide 4, conveyor belt 5, evacuation screw conveyor 7, recuperation screw conveyor 11, evacuation elevator 8, recuperation elevator 12. The beam is produced by an electron accelerator 20.

In order to provide a continuous supply of bulk material into the irradiation cell, an input hopper 21 and a semi-continuous weighing station 22, comprising a weighing hopper 23 are present. The function of the input hopper 21 before the semi-continuous weighing station 22 is to allow a continuous bulk material flow coming from the untreated bulk material storage and to stop the bulk material flow when the semi-continuous weighing station 22 is weighing. Once the weighing station is full, a shutter 24 is closing the supply from the input hopper 21 into the weighing station 22. Once the bulk material has been weighed, the shutter 25 of the weighing station opens and allows the weighing station's hopper 23 to be rapidly emptied into the buffer hopper 1. When the weighing station is empty, its shutter 25 is closed and the shutter 24 of the input hopper is opened again.

Being placed after the weighing station 22, the buffer hopper 1 absorbs the discontinuities in the bulk material flow due to said weighing station 22. The irradiation process requires a continuous bulk material supply in order to obtain acceptable dose homogeneity and sufficient continuity of the process. The buffer hopper 1 also serves to accept additional bulk material volumes coming from the recycling of badly treated or untreated bulk material (via the bulk material elevator 12). The process control system will ensure that the buffer hopper 1 does not get refilled with the bulk material to be recycled or with bulk material coming from the weighing station 22 unless its level is low enough to allow this.

From the buffer hopper 1, the bulk material is allowed through a shutter 26 into the screw feeder conveyor 2. This type of screw conveyor is preferably designed to be flood loaded and to regulate the volume of material being delivered at its output.

Figure 3:
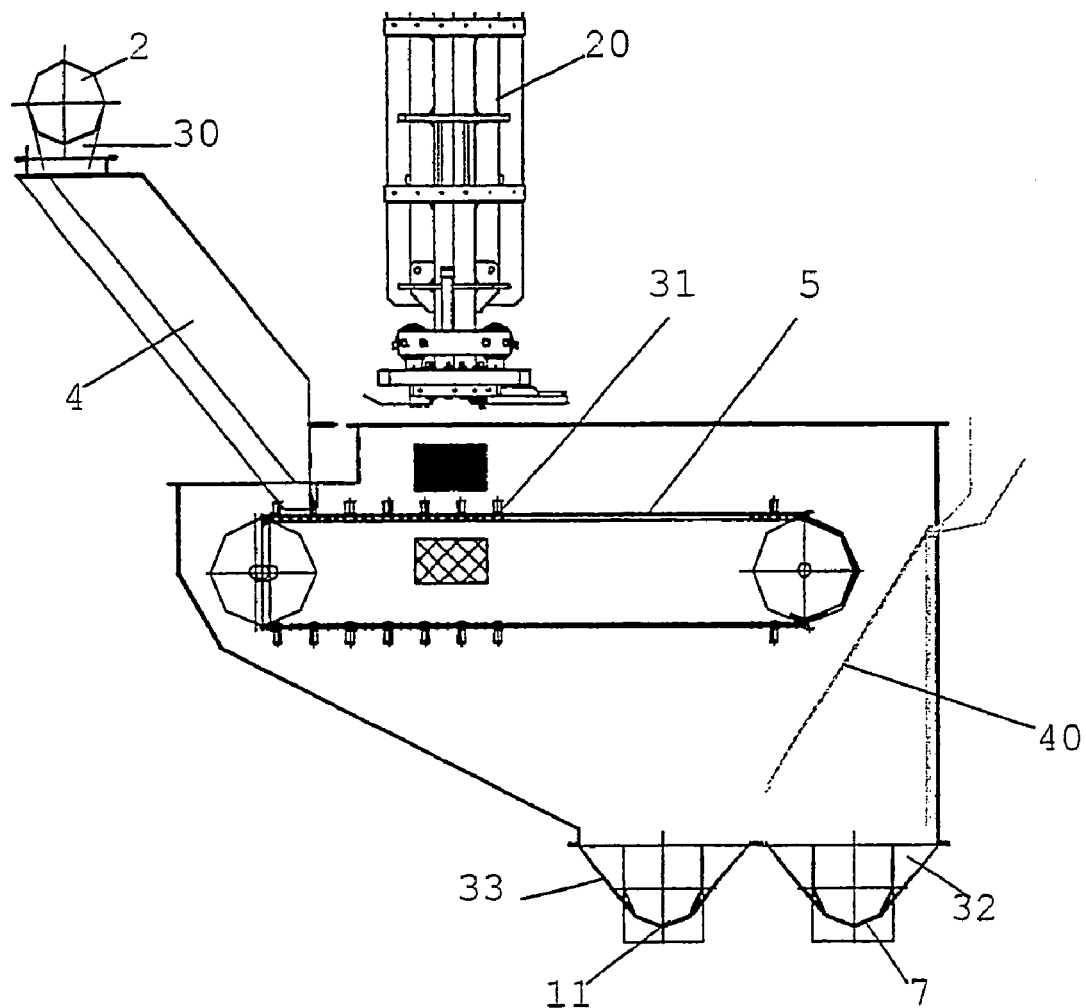
FIG. 3 represents a detail of the conveyor belt used during irradiation, according to a preferred embodiment of the present invention.
Figure 4:
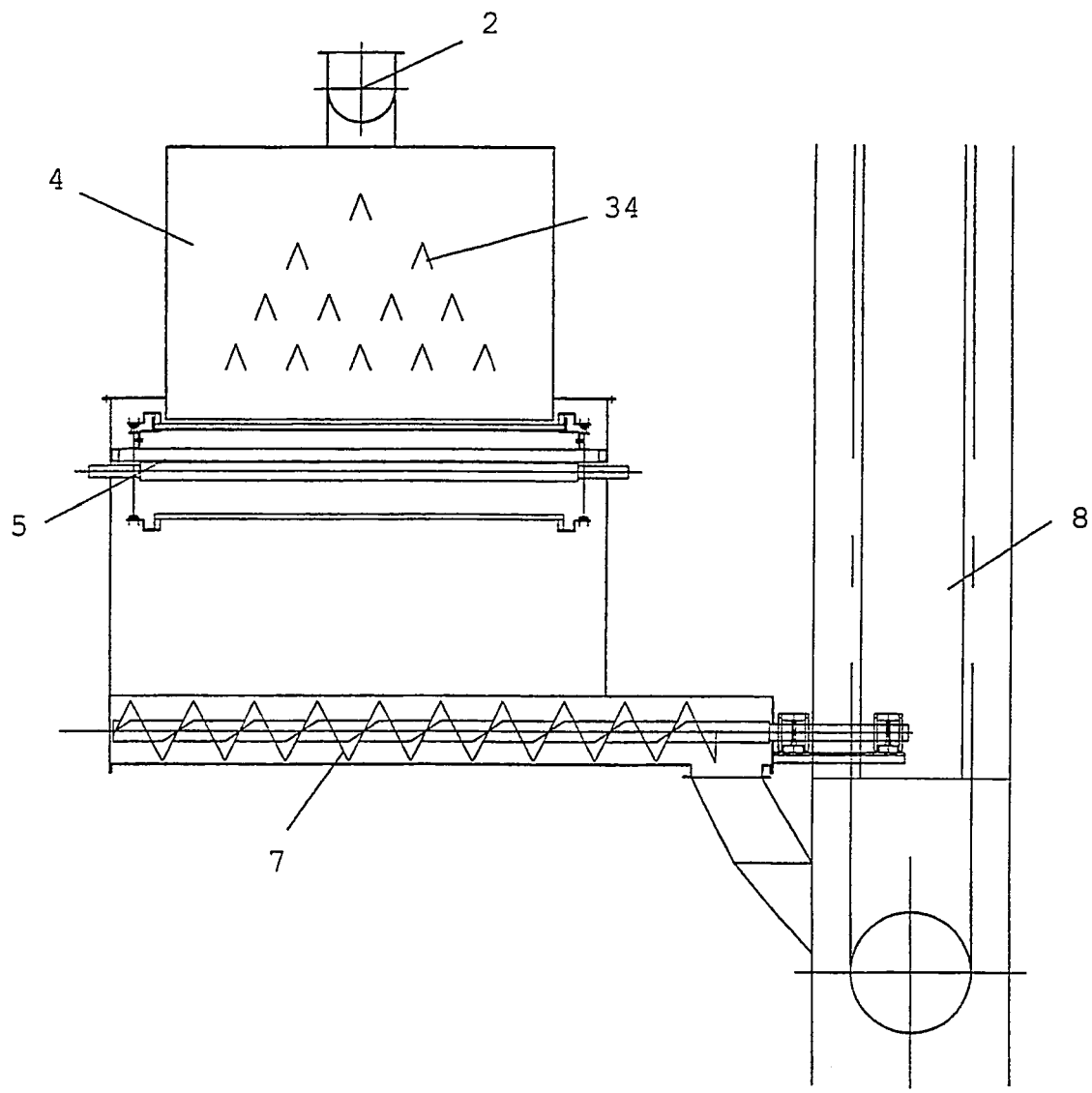
FIG. 4 represents a detail of the slide used in the installation according to a preferred embodiment of the present invention.

The bulk material, which is delivered in a controlled way by the screw feeder 2, drops into a funnel 30 at the top of the slide 4. FIG. 3 shows an enlarged image of the installation inside the irradiation cell. The slide 4 is constructed in such a way as to fulfil the following requirements:

At the outlet of the slide (bottom part) the bulk material flow is homogenous over the entire width of the conveyor belt 5: this is obtained by placing guides on the path of the sliding bulk material. These guides may be a set of chevrons 34 (inverse V) spread over the surface of the slide as shown on FIG. 4.

The layer thickness on the conveyor belt is constant: this is obtained by placing an adjustable blade horizontally at the outlet end of the slide and at a fixed distance above the conveyor belt surface.

According to the preferred embodiment, the width of the belt 5 is 2 meters, and the thickness of the layer is controlled at 2.4 cm. With a belt speed of 44 meters per minute, this allows a bulk material throughput of 100 tonne per hour, considering the bulk material density to be in the range between 0.75 and 0.8 tonne/m$^3$. Using an electron accelerator such as a Rhodotron or a Dynamitron, having a beam energy of 5 Mev, and a power of 200 kW, would allow treatment of such a quantity. The thickness of 2, 4 cm for a material having a density between 0,75 and 0, 8 tonne/m3 is chosen such that is penetrated by a 5 MeV electron beam in such a manner that the dose deposited in the upper layers of material is approximately equal to the dose deposited in the lower layers. Assuming that 55% of the power is actually deposited in the grain, a 200 kW beam can achieve a 4 kGy dose in a 100 tonne/hour throughput. A dose of 4 kGy is known to be enough to kill TCK (Tilletia Controversia Kuhn) in grain.

The bulk material is now homogeneously spread over the entire width of the conveyor belt 5 in a continuous layer. Vertical ridges 31 on the conveyor belt, assure that the bulk material is not sliding on the belt's surface when it first falls on the belt and needs to be accelerated. The cross section of these vertical ridges 31 may be a rectangle mounted perpendicularly to the conveyor's surface and to the conveyor's translation. However, such vertical ridges would impose a peak loading on the conveyor system each time such a ridge passes under an adjustable blade. In order to prevent such peak loading, the vertical ridges are preferably given an inverse V-shape or a curved shape.

The bulk material is now transported through the accelerated electron beam. When no problems occur during the irradiation process the bulk material drops off the conveyor at the end and into a funnel 32. This is the funnel that feeds treated bulk material into the treated bulk material screw conveyor 7.

If a problem occurs during the irradiation process, the conveyor 5 is brought to a complete stop by gradually decelerating. Also, the screw feeder 2 is stopped immediately. The conveyor belt's 5 length has been calculated in order to be able to stop the belt completely before any of the untreated bulk material falls off at its end. The deceleration is to be calculated in order to assure that none of the bulk material of the conveyor is slung over the top of the vertical ridges 31 during the deceleration. This assures that no untreated and badly treated bulk material falls off the conveyor belt 5 and into the treated bulk material funnel 32. The belt being stopped, it is now needed to recycle the untreated and badly treated bulk material which is still on the belt 5 and on the slide 4, to the input of the supply system. According to the preferred embodiment shown in FIG. 3, a hinged plate serving as a chute 40 is put into place, by traction on its command cable. The command cable is pulled on by an electric winch, which is placed in one of the product pits, outside the irradiation cell. This chute 40 allows to empty the conveyor into the second funnel 33 the untreated bulk material funnel. The conveyor belt is restarted at a low speed (e.g. 2 m/min) and with the chute 40 in place, the bulk material now falls into the untreated bulk material funnel 33, where it is fed into the untreated bulk material screw conveyor 11. The conveyor 11 runs until the belt 5 as well as the slide 4 at the input side are empty, and the bulk material that was present on it is evacuated by the elevator 12, which leads it back to the buffer hopper 1. Once this is done, the chute 40 is put back to its normal position, to allow the bulk material to fall once again into the treated bulk material funnel 32, and normal production can be restarted.

Both screw conveyors 7,11 for extracting the treated and the untreated and badly treated bulk material out of the irradiation cell 3 are regular screw conveyors. The throughput of the untreated bulk material screw conveyor 11 can be much lower than the one for the treated bulk material 7, since in normal operation all the bulk material is treated. According to the preferred embodiment, the screw conveyor 7 for the treated bulk material will have a throughput of 100 tonne per hour. The output side of both screw conveyors 7 and 11 is at the outside of the irradiation cell in so-called product pits (51 and 50 respectively).

The exact configuration of the bulk material elevators for the treated bulk material 8 and the untreated bulk material 12 will strongly depend upon the configuration of the site. The bulk material elevator 8 for the treated bulk material will need to feed into a conveying system that transports the bulk material to the treated bulk material storage. The untreated bulk material screw conveyor 11 may either feed into a bulk material elevator 12 for automatic recycling of the untreated bulk material or into a bin. This bin, when full, will then need to be manually emptied into the buffer hopper 1. To do so a lifting device will be needed, e.g. a crane.

In order to avoid throughput variations due to an irregular bulk material feed flow, it is necessary to control the product supply system (21,22,1,2) through a control system. The control system will take care of flow management, e.g.: do not empty the weighing station 22 into the buffer hopper 1 if it is filled with bulk material above a determined level. The control system will also take care of the management of accelerator failure, by stopping the belt 5 and supply screw conveyor 2.

In order to perform the control tasks, a number of sensors are needed. These are primarily level measurement sensors in the hoppers but the control system also analyses equipment status information (conveyor speed, conveyor running signal, . . . ) and radiation source information (beam intensity, beam OK signal, . . . ).

In order to avoid damage by irradiation, no sensitive parts should be placed in the irradiation cell 3, in particular sensors which contain semiconductors or parts which are manufactured in radiation sensitive material. According to the preferred embodiment, all this equipment is therefore placed outside the irradiation room.

The safety of the entire facility is controlled by a dedicated security control system. The security system controls access to the irradiation cell in respect to the status of the accelerator and the handling equipment. Particular attention is given to the access to the product pits (50,51).

When the accelerated electrons collide with the air particles, ozone is generated. Another task of the safety system is the control over the ozone extraction system, and the management of access to the irradiation cell in respect with ozone concentration.

The invention claimed is:

1. An apparatus which irradiates bulk material, the apparatus comprising:
   a source which produces an irradiation beam for sterilizing the bulk material,
   an irradiation cell,
   a supply system for providing a continuous supply of material to the irradiation cell, wherein the supply system comprises a conveying device configured for moving the bulk material in a downstream direction to both evacuate irradiated material in a first exit path and redirect inadequately irradiated material in a second exit path,
   a first transport device for evacuating the material after irradiation from the irradiation cell in the first exit path, and
   a device configured to redirect inadequately irradiated material after the irradiation cell from the first exit path to the second exit path in case of inadequate irradiation.

2. The apparatus according to claim 1, further comprising a second transport device for transporting the inadequately irradiated material back towards the supply system from the second exit path after an irradiation failure.

3. The apparatus according to claim 1, wherein the device configured to change the exit path comprises a hinged plate, operated by a cable, connected to a winch.

4. The apparatus according to claim 2, wherein:
   the conveying device comprises a screw conveyor;
   the supply system comprises a first hopper above a weighing station which includes a second hopper arranged above a buffer hopper leading to the screw conveyor configured to transport the material through the wall of the irradiation cell,
   a conveyor belt having a direction of translation arranged inside the irradiation cell the conveyor belt comprising vertical ridges perpendicular to the direction of translation of the conveyor belt,
   a slide arranged between the screw conveyor and the conveyor belt, the slide having guides with the shape of an inverse V,
   the first and second transport devices are screw conveyors, and
   the apparatus further comprising two material elevators for transporting the material after the first and second transport devices, the second material elevator configured to transport the material back to the buffer hopper in case of an irradiation failure.

5. The apparatus according to claim 2, wherein:
   the conveying device comprises a screw conveyor;
   the supply system comprises a first hopper, above a weighing station, comprising a second hopper arranged above a buffer hopper leading to the screw conveyor configured to transport the material through the wall of the irradiation cell and underneath the beam for irradiation,
   the first and second transport devices are screw conveyors, and
   the apparatus further comprises two material elevators for transporting the material after the first and second transport devices the second material elevator configured to transport the material back to the buffer hopper in case of an irradiation failure.

6. An apparatus which irradiates bulk material, the apparatus comprising:
   a source which produces an irradiation beam for sterilizing the bulk material,
   an irradiation cell,
   a supply system for providing a continuous supply of material to the irradiation cell,
   a first transport device for evacuating the material after irradiation from the irradiation cell,
   a device configured to change the exit path of the material after irradiation from a first exit path leading to the first transport device to a second exit path in case of irradiation failure,
   and a second transport device for transporting untreated material in the irradiation cell back towards the supply system from the second exit path after an irradiation failure.

7. The apparatus of claim 6, wherein the supply system comprises a first hopper above a weighing station which includes a second hopper arranged above a buffer hopper leading to a screw conveyor configured to transport the material through the wall of the irradiation cell,
   wherein the first and second transport devices are screw conveyors, and
   wherein the apparatus further comprises:
      a conveyor belt having a direction of translation arranged inside the irradiation cell, the conveyor belt comprising vertical ridges perpendicular to the direction of translation of the conveyor belt,
      a slide arranged between the screw conveyor and the conveyor belt, the slide having guides with the shape of an inverse V, and
      two material elevators for transporting the material after the first and second transport devices, the second material elevator configured to transport the material back to the buffer hopper in case of an irradiation failure.

8. The apparatus of claim 6, wherein the supply system comprises a first hopper, above a weighing station comprising a second hopper arranged above a buffer hopper leading to a screw conveyor configured to transport the material through the wall of the irradiation cell and underneath the beam for irradiation, wherein the first and second transport devices are screw conveyors, and wherein the apparatus further comprises two material elevators for transporting the material after the first and second transport devices, the second material elevator configured to transport the material back to the buffer hopper in case of an irradiation failure.

* * * * *